Sept. 26, 1950      F. P. BOHNE      2,523,806
LOCKING DEVICE
Filed April 5, 1949

INVENTOR
F. P. BOHNE
BY
*W. C. Parnell*
ATTORNEY

Patented Sept. 26, 1950

2,523,806

UNITED STATES PATENT OFFICE 2,523,806

LOCKING DEVICE

Frederick P. Bohne, Salem Depot, N. H., assignor to Western Electric Company, Incorporated, New York, N. Y., a corporation of New York Application April 5, 1949, Serial No. 85,667

5 Claims. (Cl. 242—130)

This invention relates to a locking device and more particularly to one in which the locking action is accomplished by friction.

In applications involving the withdrawal of wire from previously wound spools or reels, such as for example in the winding of coils, the speed with which the process is carried out and the resultant cost of the operation are often largely dependent on the speed and ease with which empty spools can be removed and replaced by full ones. This is especially true where a quantity of spools are being unwound at the same time, which is usually the case in this type of application.

One conventional way of holding spools in place during the unwinding operation has been to place them on a shaft having a threaded portion and locking them in position by a nut which is screwed on the threads until it forces the spool tightly against the shaft support. While this provides a satisfactory locking arrangement, the time required for screwing and unscrewing the nut from the shaft is appreciable, and this is particularly the case where the shaft is made long enough to mount spools of varying widths.

It is an object of this invention to enable spools of wire to be rapidly locked into unreeling position and rapidly unlocked when it is desired to replace it with another spool.

In the preferred embodiment of the invention, applicant accomplishes this object by placing a retaining member of soft resilient material having a longitudinal bore over the threads of the shaft containing a spool, the member being tapered to enter the spool head. When the retainer is pressed into the head the wedging action causes it to conform to the threads on the shaft so that a partial turn will lock the spool in place. A reverse twist allows the retaining member and the spool to be withdrawn from the shaft.

Other objects and advantages will be apparent from a study of the following detailed description taken in conjunction with the attached drawing in which.

Figure 1:
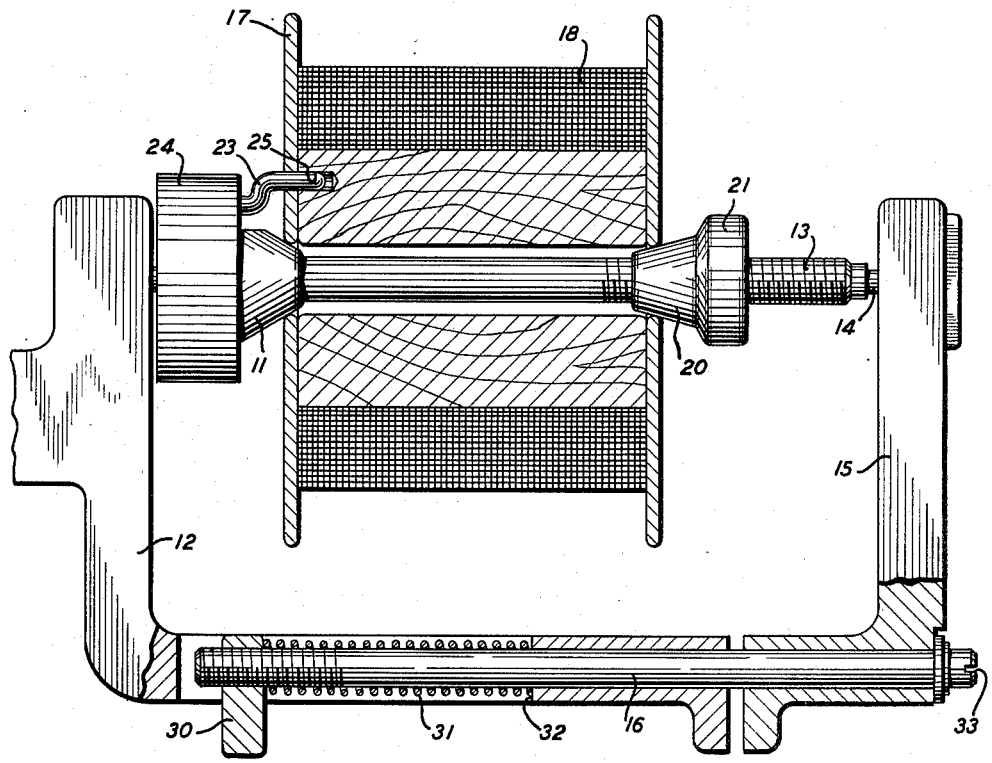
Fig. 1 is an elevational view, partially in section, showing a spool of wire locked into position by the locking device.

With reference to the drawings a spool supporting mandrel 11 is rotatably mounted in an L-shaped bracket 12. Integral with the mandrel 11 is a shaft 13 which is threaded for approximately half of its length.

The threaded end of the shaft has a reduced portion 14 which is rotatably mounted in an L-shaped bracket 15 which corresponds to the bracket 12. A pin 16 passes through the horizontal part of bracket 12 and serves to hold the two brackets in operating relationship.

A spool 17 with wire 18 is positioned on the shaft 13, with one end being supported by the mandrel 11. The other end of the spool is supported by a tapered part 20 of a spool retainer 21 made of a resilient material such as rubber, and having a longitudinal bore of approximately the same diameter as the shaft to allow it to slide freely over the threaded portion of the shaft. This retainer serves the function of locking the spool into position on the shaft, as will be hereafter explained.

A rod 23, which is rigidly mounted on a shoulder 24 of the mandrel 11, projects into a recess 25 of the spool 17 to insure having the spool rotate as one unit with the shaft and mandrel.

The pin 16 is threaded into a member 30, which is free to move with the pin. One side of the member 30 is engaged by a spring 31 which is positioned on the pin 16 and is held at its other end by shoulder 32. The slot 33 is used to turn the pin 16 with respect to the member 30 and thus to vary the compression to which the spring 31 may be subjected.

Figure 2:
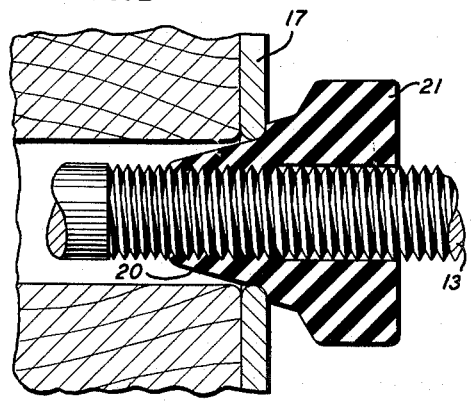
Fig. 2 is an enlarged sectional view showing the device in its locking position.
Figure 3:
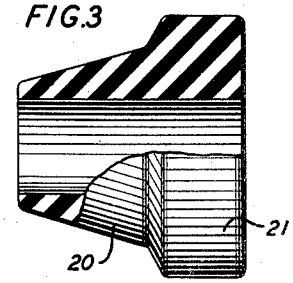
Fig. 3 is a partial sectional view of the locking device before being placed on the shaft.

The heart of the invention is the operation of the resilient spool retainer 21. Applicant has discovered that by using a tapered retainer of a resilient material, such as for example rubber, the wedging action between the tapered part of the retainer and the head of the spool when the retainer is moved toward the spool causes the rubber to conform to the threading on the shaft, as shown in Fig. 2, with the result that a rotation of the retainer will advance it along the shaft and increase the wedging action between it and the spool head. There is thereby obtained a tight frictional contact which locks the spool securely in place for the unreeling operation.

To release the spool the retainer is given a reverse twist. This unthreads the retainer sufficiently to remove the wedging contact and allow the retainer to be passed over the threads and removed.

Considering the operation as a whole, assume that it is desired to place a spool of wire on the shaft assembly to be unwound. The bracket 15 having previously been turned to clear the path of movement of the spool, the hub of the spool is passed over the shaft until one end of the spool engages the inclined surface of mandrel 11. The rubber spool retainer is then slid over the threaded portion of the shaft until it makes a wedging contact with the head of the spool. The retainer is next given a turn or two in the direction of the threads which advances it along the shaft and completes the wedging lock. The bracket 15 is then manually pulled outwardly and turned so that its mounting recess clears the shaft 13 but is in line with it. The compression in the spring 31, caused by the manual pulling on the bracket 15, is now released, and this release brings the bracket to its normal mounting position.

When it is desired to remove the spool after it has been unwound, the rubber retainer is given a reverse twist which breaks the wedging contact and unlocks the spool. The bracket 15 is pulled in a direction away from the spool far enough to clear the shaft 13 and is then given a turn about the axis of the pin 16 to clear the path of withdrawal of the spool. The retainer is first slid over the threads and off the shaft and then the spool itself is removed.

In considering and testing various resilient materials for use in making the retainer, rubber was found to be the most suitable because of its compressibility and elasticity and because its lightness kept the rotational inertia of the rotating parts of the mechanism to a minimum. Experiments with different hardnesses of rubber have shown that best results were obtained with a 70 Shore hardness in combination with a taper approximately as shown in the figures.

The threads of the shaft on which the spool is mounted should preferably be smooth rounded, in order to prevent excessive wear on the spool retainer. It is possible that the use of double or triple threads may afford a further saving in the time required for the placing and removal of spools.

Since the rubber retainer can be slid over the threads of the shaft in both its placing on and its removal, it is obvious that the invention makes possible an appreciable saving in time in the overall unwinding process, and this saving increases in importance with the number of units involved. In addition the proposed retainer is simple and inexpensive to make and lends itself to use with existing unreeling apparatus.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a locking device, the combination with a support, a shaft having a threaded portion rotatably mounted on said support, and a spool positioned on the shaft, of a resilient retainer normally slidably mounted on said shaft which is acted upon by the spool head to cause it to conform to the threads on the shaft.

2. In a locking device, the combination with a support, and a partially threaded shaft mounted on said support, of a spool positioned on the shaft, and a resilient retaining member normally slidably mounted on said shaft having a tapered portion to coact with the spool head, and which is caused by such coaction to conform to the threads on the shaft.

3. In a locking device, the combination with a support, and a partially threaded shaft mounted on said support, of a spool positioned on the shaft, and a longitudinally bored resilient retainer normally slidably mounted on said shaft and having a tapered portion to form a wedging contact with the spool head, which contact causes part of the retainer bore to have an effective internal threading conforming to the threads on the shaft.

4. In a locking device, a stationary support, a movable support, means for holding the two supports in operative relationship, a mandrel rotatably mounted on the stationary support, a shaft having a threaded portion rigidly connected to said mandrel, a spool positioned on the shaft and held at one end by the mandrel, and a longitudinally bored resilient retaining member normally slidable on said shaft and having a tapered portion to form a wedging contact with the spool head, which contact causes part of the retainer bore to have an effective internal threading conforming to the threads on the shaft.

5. In a locking device, a stationary support, a movable support, means including a pin for holding the two supports in operative relationship, a spring positioned on the pin normally urging the two supports together, a mandrel rotatably mounted on the stationary support, a shaft having a threaded portion rigidly connected to said mandrel, a spool positioned on the shaft and held at one end by the mandrel, a longitudinally bored resilient retaining member normally slidable on said shaft and having a tapered portion to form a wedging contact with the spool head, which contact causes part of the retainer bore to have an effective internal threading conforming to the threads on the shaft, an opening in the side of the spool adjacent the mandrel, and a projection rigidly mounted on the mandrel to engage the opening.

FREDERICK P. BOHNE.

REFERENCES CITED

The following references are of record in the file of this patent:

UNITED STATES PATENTS

| Number | Name | Date |
| --- | --- | --- |
| 448,138 | Ford et al. | Mar. 10, 1891 |
| 1,196,740 | Palmer | Aug. 29, 1916 |
| 1,579,217 | Kochendorfer et al. | Apr. 6, 1926 |
| 2,007,705 | Brugger | July 9, 1935 |
| 2,146,835 | Merwin | Feb. 14, 1939 |

FOREIGN PATENTS

| Number | Country | Date |
| --- | --- | --- |
| 494,072 | Great Britain | Oct. 19, 1938 |